May 9, 1939.  N. K. CHANEY ET AL  2,157,526
SEALING SURFACE MEMBER
Filed July 21, 1934
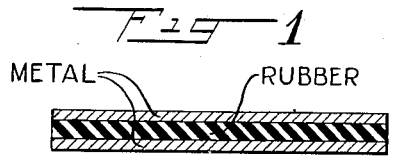
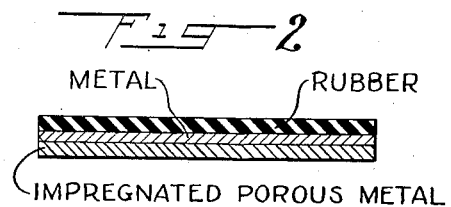
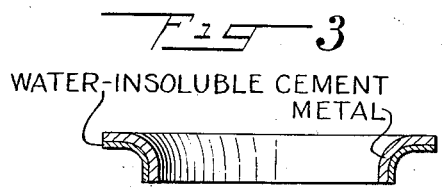
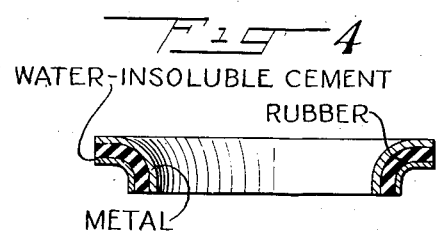
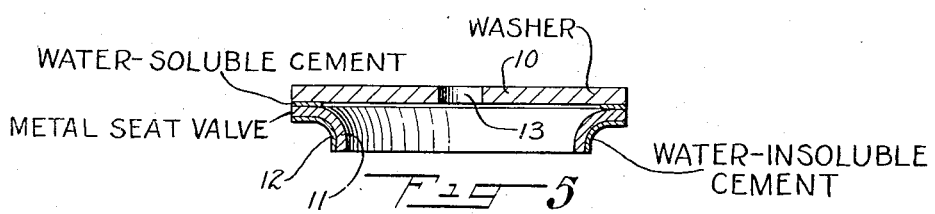
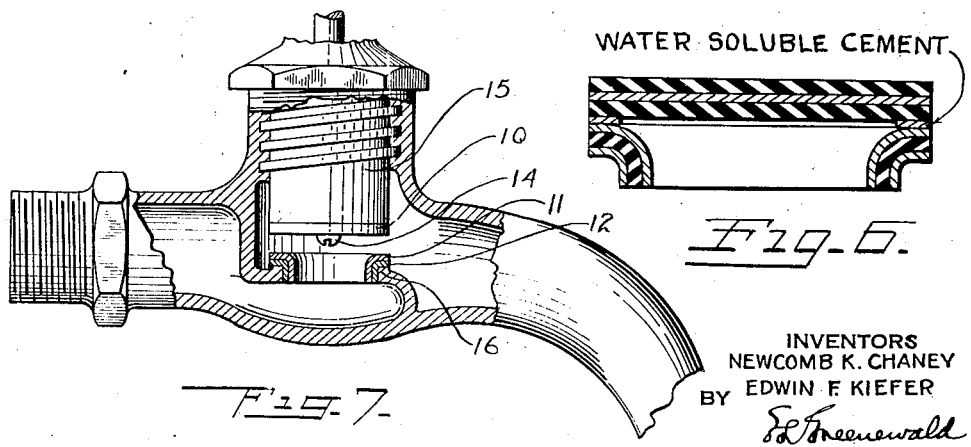
INVENTORS
NEWCOMB K. CHANEY
BY EDWIN F. KIEFER
ATTORNEY Patented May 9, 1939

2,157,526

UNITED STATES PATENT OFFICE 2,157,526

SEALING SURFACE MEMBER

Newcomb K. Chaney, Cleveland Heights, and Edwin F. Kiefer, Cleveland, Ohio, assignors, by mesne assignments, to Union Carbide and Carbon Corporation, a corporation of New York Application July 21, 1934, Serial No. 736,306

9 Claims. (Cl. 251—27)

This invention relates to members adapted to act as sealing or bearing surfaces. More especially the invention is concerned with members adapted for use as the sealing surfaces in valves and the like. The members are particularly adapted for use as renewal or replacement members but may also be advantageously used as original equipment.

Heretofore it has been common practice to renew the sealing or bearing surfaces in faucets and valves with rubber or composition washers. While various means have been employed for repairing valves in general, serious difficulties have arisen in aligning the replacement parts on the valve stem and seat so that there is uniform contact between these parts when the valve is closed. Unless the repair parts fit into the valve assembly so that they are aligned in the same manner as the original parts, leaks are likely to occur. To avoid this it has been proposed to use relatively soft materials which will adjust themselves to the configuration of the parts of the valve. The difficulty with this has been that substances which are sufficiently soft to adjust themselves are not sufficiently wear resistant.

An object of this invention is to provide a member for forming the sealing surface of valves or the like which is capable of withstanding severe wear. A further object of this invention is to provide composite repair materials for use in repairing the sealing surfaces of valves. Another object of this invention is to provide an assembled prepared member which will repair both the valve stem and the valve seat in aligned position.

Other objects and the novel features of this invention will be apparent from the following specification having reference to the accompanying drawing which illustrates certain preferred embodiments of the invention. In the drawing:

Figs. 1 and 2 are cross sectional views of discs for use in forming the sealing means of valves;

Figs. 3 and 4 are cross sectional views of composite rings for forming the sealing surfaces of valve seats;

Figs. 5 and 6 are cross sectional views of assembled repair members; and

Fig. 7 is a valve in part section having a valve member and valve seat provided with surfaces in accordance with one embodiment of this invention.

Throughout the specification reference will be made to the repair of valves having worn surfaces, but it is to be understood that the invention is not so limited, since the invention may be applied to the production of new valves, in which case the cooperating parts are made with suitable clearance and the composite elements may be so placed as to form sealing surfaces before the valve is initially used.

Throughout the specification where the use of copper is disclosed it may be ordinary metallic copper, but we prefer to use a porous copper which is formed by heating copper and/or copper oxide in a reducing atmosphere as described in the copending application of E. F. Kiefer, Serial No. 736,344, filed July 21, 1934, and now Patent No. 2,129,844, granted Sept. 13, 1938.

In Fig. 1 a washer for a valve head is shown which comprises a member made up of alternate laminations of metal and rubber cemented together. For ordinary purposes this member will be in the shape of a disc or washer, such as is commonly used in valves. The rubber should be in a soft vulcanized condition which will give a somewhat deformable sealing or bearing surface and at the same time have sufficient elasticity to permit ready adjustment of the washer to the plane of the valve seat without excessive pressure and without consequent injury to the cooperating sealing surfaces. For general use in which non-corrosive fluids are in contact with the valve parts, the metal laminations may be of copper or copper alloy. While we have shown three laminae, any number may be built up so that either a rubber or metal surface will contact with the valve seat and with the valve stem.

In Fig. 2 is shown another type of washer which consists of a sheet of metal covered on one side with a layer of soft vulcanized rubber and on the other with a bearing surface of porous metal impregnated with a softer material, desirably metal. The porous metal which is preferred comprises a copper matrix, and the impregnating material preferably comprises a soft lubricant, such as lead or lead-tin alloy. The rubber serves as a cushion and is normally in contact with the valve stem and the impregnated porous metal provides a lubricated bearing which is readily adjustable to the contour of the valve seat. Thus the relatively soft rubber is in contact with the valve stem where there is not a great deal of wear and at the same time this soft material permits of sufficient movement to secure correct alignment between the relatively harder porous metal surface and the valve seat.

In Figs. 3 and 4 we show members for providing a bearing or sealing surface on the valve seat. While well adapted for the repair of worn valve seats, they may be provided as part of the original equipment of the valve. The sealing or bearing member is made of a ring of metal, preferably copper, punched or spun with a groove on the outer part so that a hollow annular space is formed on the outer rim to receive an adhesive material. The adhesive material may advantageously be any suitable cement that is insoluble in the fluid being handled. If desired a ring of soft rubber may be arranged between the metal ring and the adhesive material as shown in Fig. 4, so that a certain amount of flexibility will be provided between the seat and the sealing member. A water-insoluble cement, such as pitch having a melting point of about 100° C., is suitable as an adhesive material for use in valves employed on lines handling hot liquids and for most purposes. In applying the sealing member to the worn seat, the pitch should be softened with benzene or some other volatile solvent until the pitch is tacky, so that the seat-covering member will adhere to the worn valve seat. The pitch is applied to the metal ring in the embodiment shown in Fig. 3 or to the rubber layer in the embodiment shown in Fig. 4. The pitch may be applied to the repairing member prior to its preparation for insertion on the worn valve seat and the pitch softened with any suitable solvent; or the pitch may be dissolved in the solvent to form a tacky cement and applied to the outer surface of the ring at the time of its insertion on the valve seat.

While the washers or discs for the valve stem and the rings for the valve seats may be used independently of each other, they may be used together when both the valve stem and the valve seat are in need of repair simultaneously. In such cases they might be individually applied. However, we prefer to employ them in the form shown in Figs. 5 and 6. A washer 10 is provided in accordance with any known methods; we preferably make this disc or washer of the forms disclosed herein and shown in Figs. 1 and 2. A bearing member or bushing for engagement with the valve seat is prepared in any known manner but preferably in accordance with the embodiments shown in Figs. 3 and 4. This valve seat bearing member or bushing 11 is provided with a coating of water-insoluble cement 12. The washer or disc and the valve seat bearing member are then secured together with a water-soluble cement such as water glass or glue. The assembly is then secured to the valve stem 15 in any suitable manner as by a screw 14 passing through the opening 13 in the disc 10. This would ordinarily be done when the valve stem is removed from the valve casing. The water-insoluble cement is then rendered tacky and the valve stem is inserted in the valve casing and screwed into closed position in the usual manner. This forces the valve seat bearing member into engagement with the worn valve seat 16 where it is retained by the water-insoluble cementing composition. When the valve is put in a line containing water, the water-soluble cement between the bearing surfaces would be sufficiently softened so that when the valve is opened the ring is secured to the valve seat and the disc or washer is secured to the valve stem. The repaired valve is then in the form shown in Fig. 7.

While we have shown several embodiments of our invention, it is to be understood that changes may be made by those skilled in the art without departing from the scope of this invention and that we do not wish to limit ourselves except as set forth in the appended claims.

We claim:

1. A replaceable sealing member comprising a layer of copper impregnated with a lubricant and having a layer of rubber secured to said sealing member.

2. A replaceable member having a sealing surface comprising a sheet of metal having a layer of rubber on one side and a layer of porous copper impregnated with a lubricant on the other side.

3. A washer for valves or the like comprising a disc of rubber, a disc of metal, and a disc of a porous metal containing a lubricant, said discs being united to each other.

4. A valve repair assembly comprising a washer, a valve seat engaging member secured at one side to said washer by a water-soluble cement, and a water-insoluble cement adhering to the valve seat engaging member on the opposite side thereof.

5. A valve assembly comprising a washer; said washer consisting of a mutually united disc of rubber, a disc of metal, and a disc of porous metal containing a lubricant; and a bushing united on one side to said washer by a water-soluble cement; said bushing being coated on the other side with water-insoluble cement.

6. A valve repair assembly comprising a washer; and a valve seat repairing means secured to said washer by a water-soluble cement; said means comprising a metallic ring substantially the shape of the valve seat, and resilient means secured to said ring on the side adapted to engage the valve seat.

7. A valve repair assembly according to claim 6 wherein said resilient means is coated with water-insoluble cement.

8. A replaceable sealing member comprising a layer of metal impregnated with a lubricant and having a layer of soft resilient material secured to said sealing member.

9. A replaceable sealing member comprising a layer of soft resilient material, a layer of porous material impregnated with a lubricant, and a supporting member between and united to said layers.

NEWCOMB K. CHANEY.
EDWIN F. KIEFER.